(No Model.)

J. F. PRIBNOW.
DEVICE FOR SHAPING SWAGED SAW TEETH.

No. 514,963. Patented Feb. 20, 1894.

WITNESSES:
F. W. Warner.
J. A. Walsh.

INVENTOR
John F. Pribnow,
BY
Chester Bradford,
ATTORNEY.

UNITED STATES PATENT OFFICE.

JOHN F. PRIBNOW, OF INDIANAPOLIS, INDIANA.

DEVICE FOR SHAPING SWAGED SAW-TEETH.

SPECIFICATION forming part of Letters Patent No. 514,963, dated February 20, 1894.

Application filed June 22, 1893. Serial No. 478,439. (No model.)

*To all whom it may concern:*

Be it known that I, JOHN F. PRIBNOW, a citizen of the United States, residing at Indianapolis, in the county of Marion and State of Indiana, have invented certain new and useful Improvements in Devices for Shaping Swaged Saw-Teeth, of which the following is a specification.

My present invention consists in certain improvements upon that class of tools whereby the swaged points of saw teeth are reduced to an even and uniform condition, and is an improvement upon that shown and described in my Patent No. 463,547, dated November 17, 1891. A tool embodying my said improvements will be first fully described, after which said improvements will be more particularly pointed out in the claims.

Figure 1:
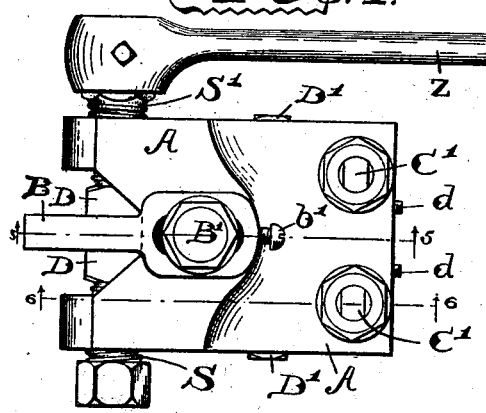
Figure 2:
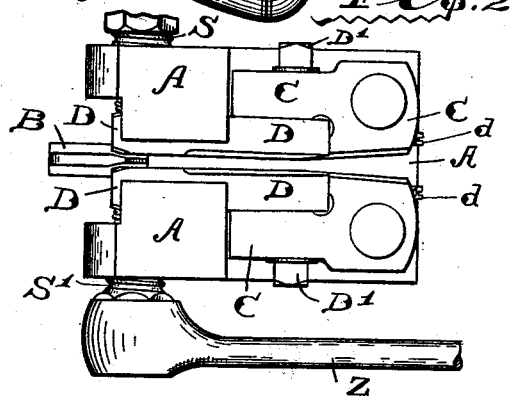
Figure 3:
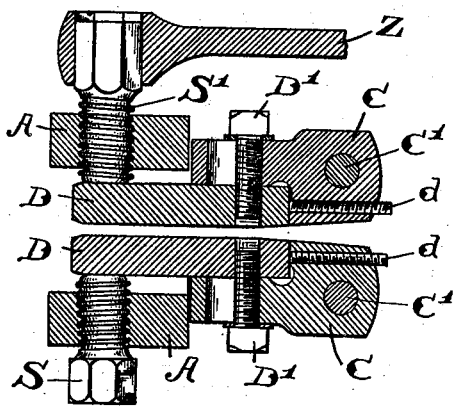
Figure 4:
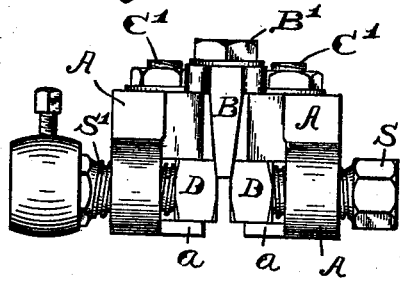
Figure 5:
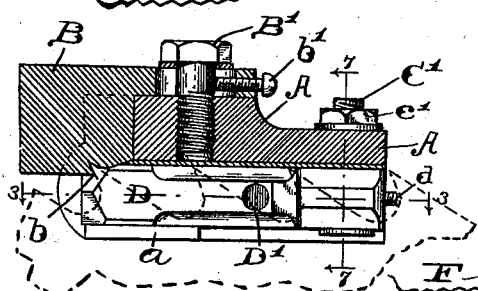
Figure 6:
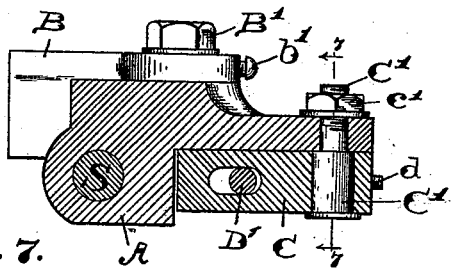

Referring to the accompanying drawings, which are made a part hereof, and on which similar letters of reference indicate similar parts, Figure 1 is a top or plan view of a shaper embodying my said improvements; Fig. 2 an under side plan of the same; Fig. 3 a horizontal sectional view looking downwardly from the dotted line 3 3 in Fig. 5; Fig. 4 a front end elevation; Fig. 5 a central longitudinal sectional view on the dotted line 5 5 in Fig. 1; Fig. 6 a similar view on the dotted line 6 6, and Fig. 7 a transverse sectional view looking toward the right from the dotted line 7 7 in Fig. 5.

In said drawings the portions marked A represent the body or frame of the tool; B the stop for determining the position of the saw teeth, in operation; C carrying blocks for the clamping jaws, and D said clamping jaws.

The frame A is formed to properly carry the other parts, which are mostly attached thereto by bolts, as shown. Wings $a$ extend out under and carry the jaws D at the forward ends, where they are otherwise unsupported except by the friction of the clamping screws.

The stop B is secured to the frame A by a bolt B' which passes through a slot in the stop and down into a suitable threaded perforation in the frame, as shown most plainly in Fig. 5. This stop is adjusted longitudinally of the frame, as may be desired, to position the points of the saw teeth being operated upon, which points pass into a notch behind the point $b$ on its lower side. Very fine and accurate adjustment of the stop is secured by means of the set screw $b'$, which passes from the rear into the slot therein, and against the side of the bolt B', as shown in Fig. 5. A portion of the bolt B' which passes through the slot in the stop B is left smooth, in order to form a good bearing for the set screw. In adjusting this stop the bolt B' is loosened, the set screw $b'$ adjusted to the desired point, and the stop B moved forward until the set screw comes in contact with the bolt, when the bolt is tightened down. The stop is thus prevented from being accidentally moved forward, in use, as it comes against the points of the saw teeth.

Figure 7:
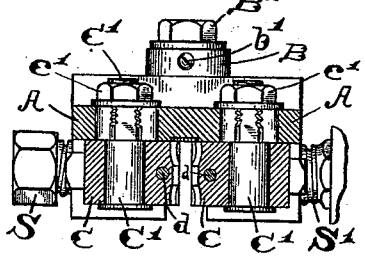

The carrying blocks C for the clamping jaws D are secured to the frame A by the bolts C' which pass up through holes in said carrying blocks and continue through transverse slots in the rear portion of the frame A. The carrying blocks are enabled to be swiveled to the desired adjustment on their bolts, while their lateral position, or position relative to each other, is determined by the positions of the bolts in the slots in the frame. In order to enable these bolts to serve this double purpose, they are turned down smaller where they pass through the slots than they are where they pass through the blocks, and the length of the larger part, between the heads and the shoulders so formed, is very slightly greater than the thickness of the carrying blocks C, so that the swiveling of said blocks on the bolts is not prevented when said bolts are drawn up tightly by their nuts. The smaller portions of the bolts are also flattened somewhat, upon two sides, and the slots through which they pass in the frame A are made of a width corresponding to the smaller diameter of the bolts, so that the bolts are held from turning in the slots, and thus the nuts thereon are enabled to be turned up tightly, and the bolts themselves are not revolved. These peculiarities of construction are best shown in Figs. 1 and 7. In order to position these carrying blocks nearer to or farther from each other, it is only necessary to loosen the nuts $c'$ slightly, slip the bolts C' carrying said blocks to the position desired, and again tighten said nuts. Said bolts C' by means of this construction serve perfectly both as pivots for the carrying block C, and as a means of uniting them firmly at any desired point to the frame A.

The clamping jaws D are formed with flat sides where they come against the sides of the saw plate, and with beveled edges and corners to receive the points of the saw teeth. Said jaws are united to the carrying blocks C by bolts D' which pass through slots in said carrying blocks and into the threaded perforations in the rear portions of said clamping jaws, as shown most plainly in Fig. 3. The jaws are thus capable of longitudinal adjustment on the carrying blocks, which may be effected by simply loosening the bolt D' and slipping the jaw to the desired position and re-tightening said bolts. As will be readily understood, one of the jaws may thus be advanced slightly more than the other in cases where that becomes necessary to the desired dressing or shaping of the points of the saw teeth. Great accuracy in the positioning of the clamping jaws on the carrying blocks is secured by means of the set screws $d$, which pass in from the rear through the carrying blocks against the rear ends of the clamping jaws, as shown most plainly in Fig. 3. The positions of the clamping jaws, laterally, are determined by the main clamping screws S and S' mounted in the lower side portions of the frame A. The screw S is turned in until it drives the clamping jaw, against which it comes, to the desired position. Upon the screw S' is a lever Z by which it is operated. Of course, both screws might be provided with levers if desired, but this is not only unnecessary but usually undesirable.

The operation is as follows: The tool being adjusted to the desired work, it is placed upon the edge of a saw, with the first tooth to be operated upon in the notch behind the point $b$ in the stop B. The lever L is then swung over, driving the jaw which it operates toward the other jaw, and pinching the sides of the point of the tooth closely between them until the faces of the jaws come against the faces of the plain saw plate. It is understood, of course, that the saw has previously been swaged, or had the points of the teeth spread, by some other machine, or other operation. As will be readily understood, this operation reduces the sides of the points of the various saw teeth to an exactly equal width or gage, as it operates upon one after another successively, and leaves them perfectly straight and uniform along the sides of said points, throughout the length of the saw.

Having thus fully described my said invention, what I claim as new, and desire to secure by Letters Patent, is—

1. The combination, in a shaper for the points of saw teeth, of the frame-work, a stop, clamping jaws, and carrying blocks for said jaws, said carrying blocks being secured to the frame by two-sized bolts, whereby they serve both as pivots and securing bolts, substantially as set forth.

2. The combination, in a shaper for the points of saw teeth, of the frame-work, the clamping jaws, carrying blocks for said clamping jaws, and two-sized bolts uniting the same, said carrying blocks having perforations, and said frame having slots through which said bolts pass, the smaller portions of the bolts being flattened where they pass through said slots, and said slots being equal in width to the smaller diameter of the bolts, whereby said bolts are prevented from turning, substantially as shown and described.

3. The combination, in a shaper for the points of saw teeth, of the frame-work, carrying blocks for the clamping jaws pivoted to the frame-work, and said clamping jaws independently adjustable upon said carrying blocks, substantially as shown and described.

4. The combination, in a shaper for the points of saw teeth, of the frame-work, carrying blocks for the clamping jaws pivoted thereto, and said clamping jaws secured to said carrying blocks by bolts passing through slots and into said jaws, and set screws $d$ whereby the longitudinal adjustment of the jaws may be finely regulated, substantially as shown and described.

In witness whereof I have hereunto set my hand and seal, at Indianapolis, Indiana, this 17th day of June, A. D. 1893.

JOHN F. PRIBNOW. [L. S.]

Witnesses:
CHESTER BRADFORD,
JAMES A. WALSH.